United States Patent [19]
Pearman

[11] Patent Number: 6,104,732
[45] Date of Patent: Aug. 15, 2000

[54] INTEGRATED SIGNAL ROUTING CIRCUIT

[75] Inventor: Trevor Pearman, Sunnyvale, Calif.

[73] Assignee: G-2 Networks, Inc., Los Gatos, Calif.

[21] Appl. No.: 09/033,866

[22] Filed: Mar. 3, 1998

Related U.S. Application Data

[60] Provisional application No. 60/062,812, Oct. 24, 1997.

[51] Int. Cl.[7] ....................................................... H04J 3/02
[52] U.S. Cl. .............................................................. 370/541
[58] Field of Search ............................. 370/532, 535–42, 370/445, 351, 366–8, 503–13

[56] References Cited

U.S. PATENT DOCUMENTS

| | | |
|---|---|---|
| 4,373,181 | 2/1983 | Chisholm et al. . |
| 4,684,831 | 8/1987 | Kruest . |
| 4,787,082 | 11/1988 | Delaney et al. . |
| 5,448,598 | 9/1995 | Yousefi et al. . |
| 5,485,113 | 1/1996 | Ito et al. . |
| 5,533,072 | 7/1996 | Georgiou et al. . |
| 5,548,280 | 8/1996 | Pearce . |
| 5,550,860 | 8/1996 | Georgiou et al. . |
| 5,578,939 | 11/1996 | Beers et al. . |
| 5,587,675 | 12/1996 | Schmitt . |
| 5,592,629 | 1/1997 | Gamble . |
| 5,598,443 | 1/1997 | Poeppleman . |
| 5,623,518 | 4/1997 | Pfiffner . |
| 5,633,899 | 5/1997 | Fiedler et al. . |

OTHER PUBLICATIONS

D. Chen et al., "A Single–Chip 266Mb/s CMOS Transmitter Receiver For Serial Data Communications", Proceedings of the IEEE International Solid–State Circuits Conference, Feb. 23, 1993, pp. 100, 101 and 269.

L.A. Bergman et al., "A Synchronous Fiber Optic Ring Local Area Network For Multigigabit/s Mixed–Traffic Communication", IEEE Journal on Selected Areas in Communications, vol. SAC–03, No. 6, Nov. 1985, pp. 842–848.

Robert W. Kembel, :In–Depth Fibre Channel Arbitrated Loop, 1997 Northwest Learning Associates, pp. 27–30.

Jurgens, C.; "Fibre Channel: A connection to the future," *Computer*, vol. 28, Aug. 1995; available at.

Nelson, C.; "Fiber Channel offers speed, interoperability," *Communications Design*, Part 4; available at http://techweb.cmp.com/eet/nick/comdesign/fibercha.html.

"Fiber Channel Components," *Electronic Components*, Hewlett Packard; available at http://hpcc920.external.hp.com;HP–COMP/3.0/3.3.t.5.6.html.

"Fibre Channel Products," *AMCC*, available at http://www.amcc.com/product–guide/fibrechannel/fibre.html.

"CERN Fibre Channel homepage," available at http://www.cern.ch/HSI/fcs/fcs.html.

"Fibre Channel Systems Initiative (FCSI)," Mar. 13, 1995, available at http://www.amdahl.com/ext/CARP/FCA/FCSI.html.

"Fibre Channel Association," May 23, 1997, available at http://amdahl.com/ext/CARP/FCA/FCA.html.

Meggyesi, Z.; "Fibre Channel Overview," available at http://www1.cern.ch/HSI/fcs/spec/overview.htm.

Shafir, H.; "Gigabit networking technologies converge," *Communications Design*, Part 4; available at http://techweb.cmp.com/eet/nick/comdesign/gigabitn.html.

(List continued on next page.)

*Primary Examiner*—Douglas W. Olms
*Assistant Examiner*—David R Vincent
*Attorney, Agent, or Firm*—Pillsbury Madison & Sutro, LLP

[57] ABSTRACT

An integrated routing circuit that provides serial-to-parallel and parallel-to-serial data conversion, and data transmission over various types of media including coaxial, twisted-pair, and fiber optic media. The integrated routing circuit has two receivers, three multiplexers, a reclocking circuit, a serial to parallel converter, a parallel to serial converter, a serial transmitter, an output controller, and a parallel transmitter. The circuits that form the integrated routing circuit are arranged so that either serial or parallel data sources can be selected from a plurality of inputs to the integrated routing circuit and so that various routing paths can be established for the selected sources. The selected routing path is established via the use of control words.

40 Claims, 10 Drawing Sheets

OTHER PUBLICATIONS

Computer and Communication Standards, available at http://www.cmpcmm.com/cc/standards.html.

Fibre Channel Manufactures, available at http://www.cern.ch/HSI/fcs/manufac/manufac/htm.

FC–0/FC–1 Chips, available at http://www.cern.ch/HSI/fcs/comps/fc0_1.htm.

VLSI Technology, Inc. Product Bulletin, Aug. 1995.

Vitesse Semiconductor Corporation, draft of "Advance Product Information VSC7120 for 1.0625 Gbit/Sec Fibre Channel Repeater Circuit," Oct. 19, 1995.

Applied Micro Circuits Corporation, Preliminary Device Specification for Fibre Channel and Gigabit Ethernet Transceiver S2053, Feb. 3, 1998.

Gore Creative Technologies "Copper Gigabaud Link Module FCN 7181," Jun. 3, 1997, available at http://222.amdahl.com/ext/CARP/FCA/products/Gore/CuGLM.htm.

Fibre Channel White Paper, available at http://www.unisys.com/marketplace/aseries/techlib/whpapers/fibchan.htm.

Global Engineering, "Fibre Channel; Physical and Signaling Interface (FC–PH)," working draft proposed American National Standard for Information Systems, Jun. 1, 1994.

INTEGRATED SIGNAL ROUTING CIRCUIT

CROSS REFERENCE TO RELATED APPLICATION

This application is related to and claims priority from U.S. provisional application Ser. No. 60/062,812 filed Oct. 24, 1997.

FIELD OF THE INVENTION

The present invention relates to an integrated routing circuit, and, more particularly, an integrated routing circuit adapted to implement the FC-0 layer of a fibre channel, provide serial-to-parallel and parallel-to-serial data conversion, byte framing, synchronization, and data transmission over coaxial, twisted-pair, and fiber optic media.

BACKGROUND OF THE RELATED ART

Various standards exist to ensure compatibility between communications devices made by various manufacturers. One such standard, known as Fibre Channel, describes a protocol for interconnecting communications devices through the use of various types of transmission media. This standard not only describes a protocol for various transmission data rates, but also for safety operations of laser diodes when the transmission medium is optical fiber.

Since it is difficult to ensure that an optical fiber media will be readily available for routing signals among communication devices, Fibre Channel allows for data transmissions, at a similar symbol rate, over copper wire, for a much shorter distance.

Circuit cards presently exist that implement certain aspects of Fibre Channel. Certain copper gigabit link modules (GLM), for instance, provide circuit cards that permit parallel-to-serial and serial-to-parallel conversion of encoded data that can be serially transmitted over a copper transmission medium at rates such as 1.0625 GBits/sec. Other circuit cards exist that provide an interface between an optical transmission medium and a copper transmission medium.

Despite the existence of such conventional circuit card devices, using such devices to implement various switching configurations is expensive and not as reliable as desired. Furthermore, these conventional circuit cards are designed for specific kinds of signal routing that cannot be configured through software control.

SUMMARY OF THE INVENTION

It is, therefore, an object of the present invention to provide a signal routing device that provides greater switching functionality at low bit error rates.

It is another object of the present invention to provide a signal routing device that provides greater switching functionality at low operating voltages.

It is another object of the present invention to provide an integrated circuit signal routing device with programmable switching capabilities.

It is a further object of the present invention to provide an integrated circuit signal routing device that can be cascaded with other similar integrated circuit signal routing devices and still provide for data transmission at low bit error rates.

It is a further object of the present invention to provide an integrated circuit signal routing device that can connect to devices that support either OFC laser based systems or other low power optical fibre laser based systems.

In order to attain the above objects of the present invention, among others, the present invention provides a plurality of serially connected Fibre Channel port integrated circuits that are programmably controlled. Each Fibre Channel integrated circuit contains clock and data recovery, parallel-to-serial and serial-to-parallel data conversion, byte framing and synchronization, and driver and receiver circuits that allow for efficient programmable signal routing.

The programmable switching capabilities of the Fibre Channel integrated circuit allow it to be used in other switching applications, such as a single or multi node adapter or multi-port switch or multi-port hub/concentrator.

BRIEF DESCRIPTION OF THE DRAWINGS

These and other objects, features and advantages of the present invention are better understood by reading the following detailed description of a preferred embodiment, taken in conjunction with the accompanying drawings, in which.

DETAILED DESCRIPTION OF A PREFERRED EMBODIMENT

Figure 1:
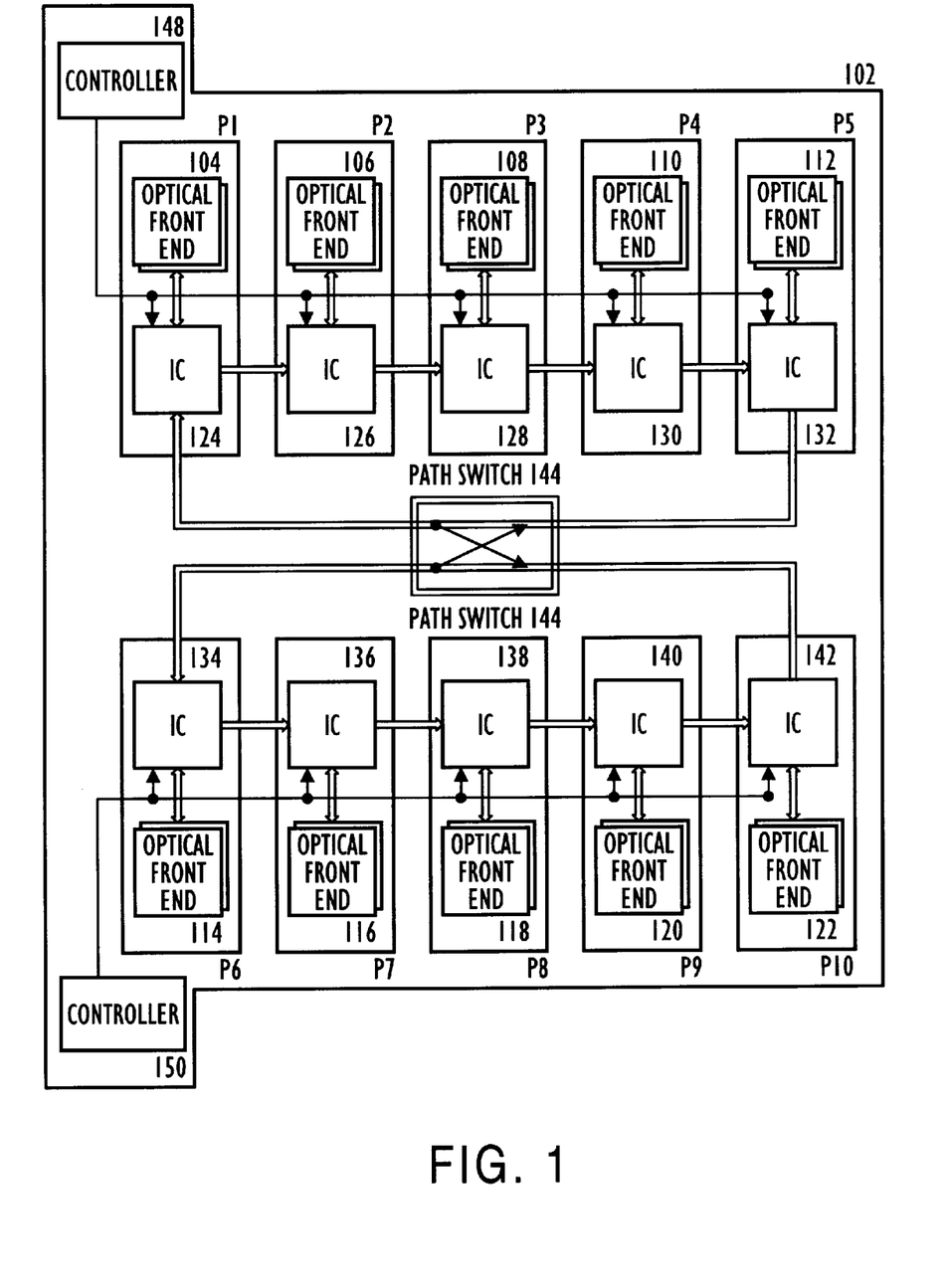
FIG. 1 illustrates a 10-port network hub according to the present invention.
Figure 9:
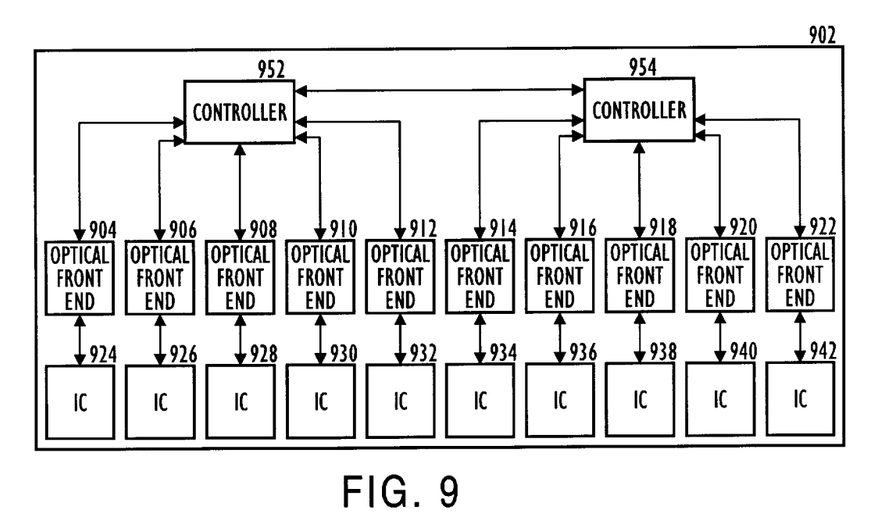
FIG. 9 illustrates a 10-port network switch or repeaters according to the present invention.

FIG. 1 illustrates a 10-port Fibre Channel network hub 102 according to the present invention. Each port of the network hub comprises one of optical front ends 104, 106, 108, . . . 122, each of which are identical, and one of port ICs 124, 126, 128 . . . 142, each of which are also identical, although each will be programmed independently, as will be described further hereinafter, during actual usage of the network hub 102. As will become apparent hereinafter, the construction of the hub 102 allows it to be used as a hub for Fibre Channel. A similar construction for Gigabit Ethernet signals is depicted in FIG. 9.

In one embodiment, the topography of the hub 102 is a loop design whereby devices attached to each port arbitrate for access to the loop and, once granted, establishes a dedicated connection between itself and another port within the loop. As described in detail below, this loop design supports simultaneous, symmetrical, bi-directional flow, and thus supports full duplex operation.

The arbitrated loop topography shown in FIG. 1 supports many different configurations. In one configuration, a single 5-port loop is achieved using ports P1–P5. In a second configuration, two loops are achieved wherein each loop contains 5 ports. The first loop utilizes ports P1–P5, and the second loop utilizes ports P6–P10. In yet a third configuration a single 10-port loop is achieved. This is accomplished by using a path switch 144, which connects port P5 to port P6 and port P10 to port P1. The user can convert between each configuration via a switch (not shown).

A controller, such as an 8051 microcontroller, is provided for controlling the ports. In one embodiment, two controllers 148 and 150 are provided, wherein each controller controls five ports. The way in which a controller can regulate the operation of the individual ports is described in detail below.

Further, the present invention can be configured to implement various fibre channel implementations, including the Fibre Channel standard. For example, the American National Standards Institute (ANSI) standard requires transmission frequencies of 1.0625 GHz. Also, the Gigabit Ethernet standard requires transmission frequencies of 1.25 GHz.

Figure 2:
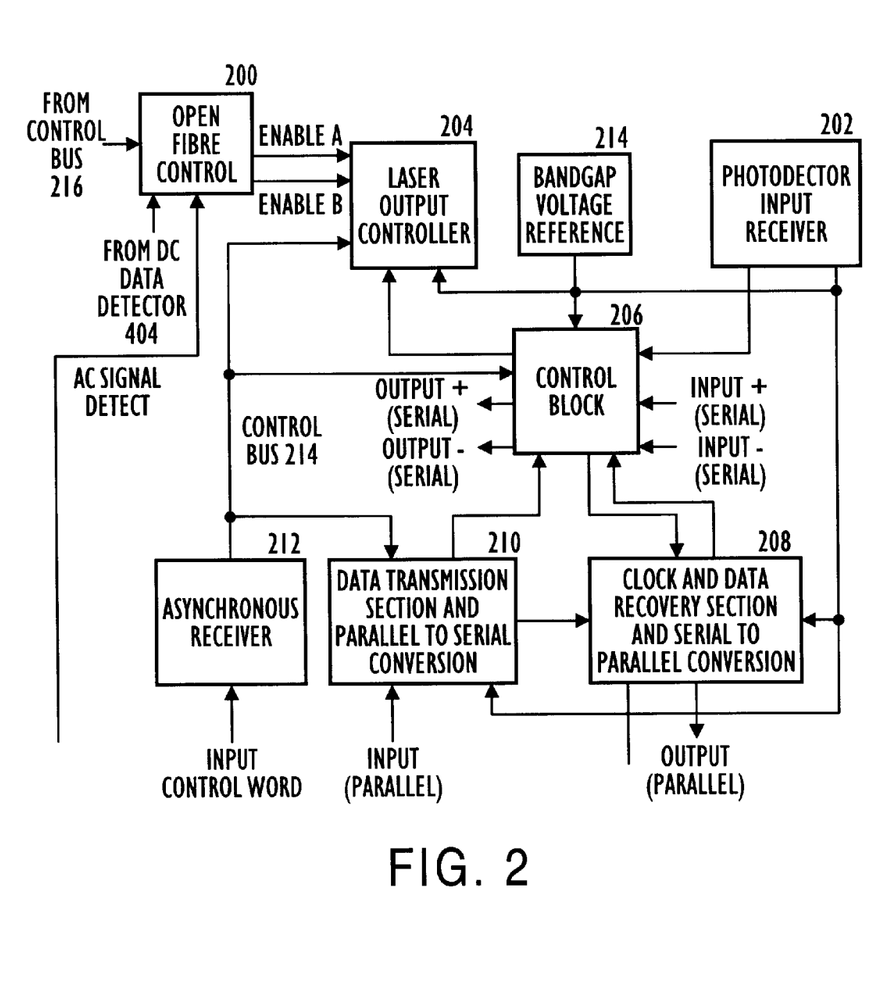
FIG. 2 is a block diagram of one of the ports depicted in FIG. 1.

FIG. 2 illustrates one port IC 124. The other port ICs are similarly arranged when implementing the hub 102.

As illustrated, each port IC 124 contains Open Fibre Control 200, Photodetector Input Receiver 202, a Laser Output Controller 204, a Control Block 206, a Clock/Data Recovery and Serial to Parallel Conversion Section 208, a Data Transmission and Parallel to Serial Conversion Section 210, an Asynchronous Receiver 212, and a bandgap voltage reference 214, which establishes a bias level for various cells on the port IC 124 so that there is less variability between ICs, and which provides voltage supply independence. Data paths on the port IC 124 are preferably implemented as using differential lines that transmit differentially amplified signals, as is known, and it should be understood that the single lines passing data on the port IC 124 are differential lines, even though these differential lines are illustrated as a single line in the Figures so as not to make them confusing.

Figure 3:
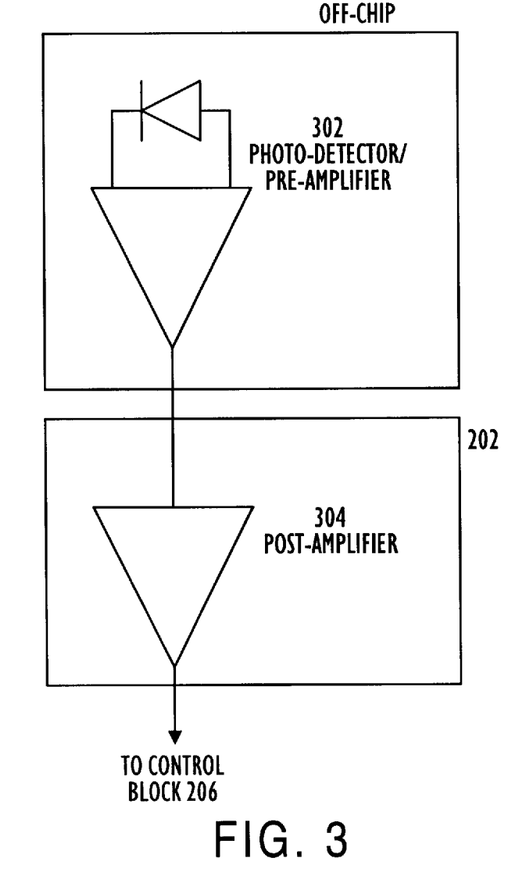
FIG. 3 is a more detailed block diagram of the Laser Input Receiver depicted in FIG. 2.

As seen in FIG. 3, Photodetector Input Receiver 202 has, for example, a post-amplifier 304 and is connected to a photo-detector/pre-amplifier 302. Photo-detector 302 receives serial data transmitted via an optical fiber. The received data is amplified by post-amplifier 304 and is transmitted to Control Block 206 as a differential signal. Post-amplifier 304 will have a gain that allows the resulting signal to be compatible with the logic levels within, for example, port IC 124

Figure 4:
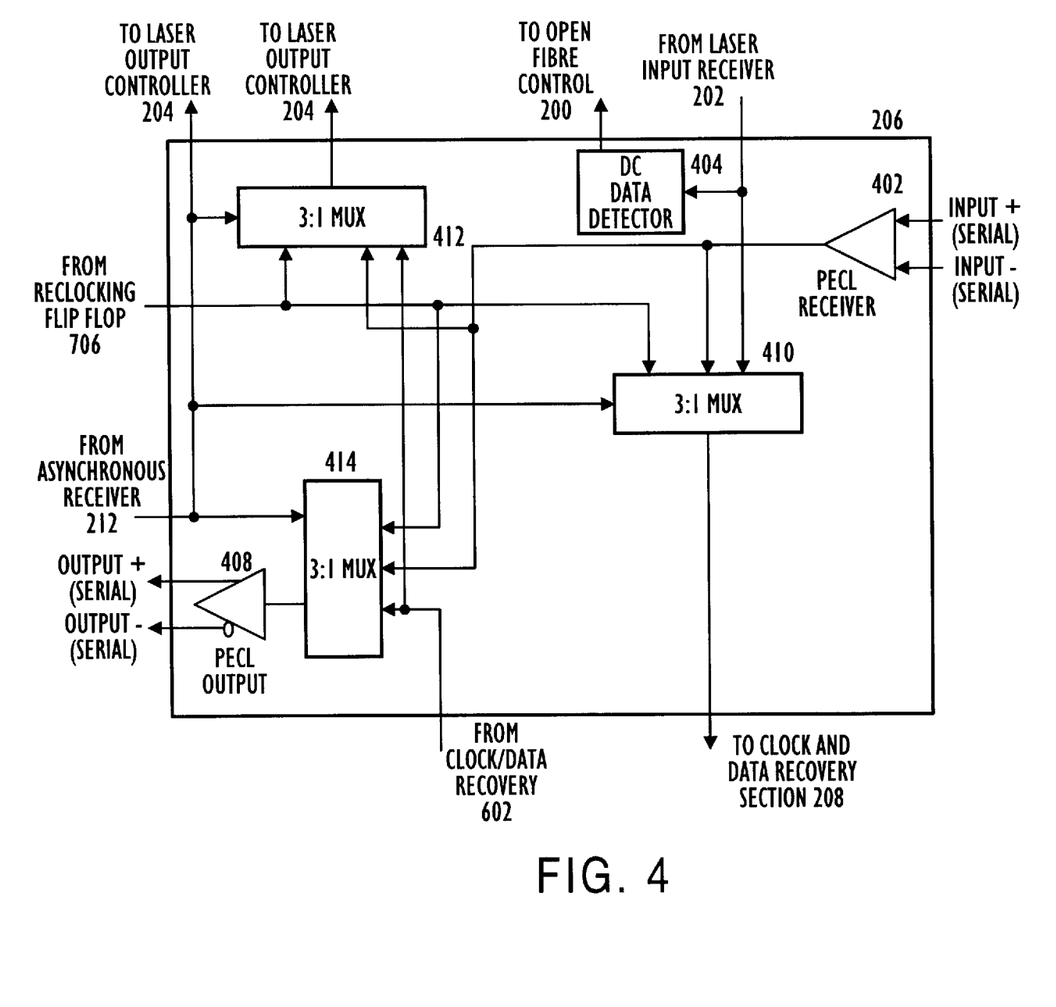
FIG. 4 is a more detailed block diagram of the Control Block depicted in FIG. 2.

As seen in FIG. 4, Control Block 206 has, for example, a differential Pseudo-emitter Coupled Logic (PECL) Receiver 402, a Data Detector 404, PECL Output 408, and three 3 to 1 multiplexers 410, 412, and 414. The data from post-amplifier 304 is differentially transmitted to Data Detector 404. The output of Data Detector 404 is supplied to Open Fibre Control block 200 illustrated in FIG. 2, which implements the functions set forth in Annex I of the ANSI FC-0 layer design standards. PECL Receiver 402 in FIG. 4 receives data from another fibre channel, gigabit, or similar port IC. Multiplexer 410 selects data, in differential form, that has been: (1) output by Photodetector Input Receiver 202, (2) received by PECL Receiver 402, or (3) output by Data Transmission and Parallel to Serial Conversion Section 210. The input selected by multiplexer 410 is output, in differential form, to Clock/Data Recovery and Serial to Parallel Conversion Section 208. Multiplexer 412 selects, in differential form, data that has been: (1) output to the Control Block 206 by Clock/Data Recovery and Serial to Parallel Conversion Section 208, (2) received by PECL Receiver 402, or (3) output by Data Transmission and Parallel to Serial Conversion Section 210. The input selected by multiplexer 412 is output, in differential form, to Laser Output Controller 204. Multiplexer 414 selects data, in differential form, that has been: (1) output to the Control Block 206 by Clock/Data Recovery and Serial to Parallel Conversion Circuit Section 208, (2) received by PECL Receiver 402, or (3) output by Data Transmission and Parallel to Serial Conversion Section 210. The input selected by multiplexer 414 is provided, in differential form, to PECL Output 408, which outputs the data to another fibre channel, gigabit, or similar port IC. Multiplexers 410, 412, and 414, and Open Fibre Control block 200 are controlled by Asynchronous Receiver 212 via a control bus 216.

Control Block 206 enables the port IC 124 to operate in various modes. For example, based on the information contained on the control bus, Control Block 206 can simply act as a conduit for transferring data between two other ports. One manner in which this can be accomplished is by having Multiplexer 414 select the output of PECL Receiver 402, which causes the data to be output to PECL output 408.

Control block 206 can also transfer data that is input from Photodetector Input Receiver 202 and output from Laser Output Controller 204 when the port IC 124 in a hub 102 is connected to a device. For such a transfer, the Multiplexer 410 selects the output from the Photodetector Input Receiver 202, and, after clock and data recovery in Clock/Data Recovery and Serial to Parallel Conversion Section 208, is output to the PECL output 408. Data from a neighboring IC is input to PECL receiver 402 and Multiplexer 412, which then outputs data to the Laser Output Controller 204.

The port IC 124 can also be configured in a loop-back mode, in which the parallel data received on the parallel input lines of Data Transmission and Parallel to Serial Conversion Section 210 can be reclocked through Clock/Data Recovery and Serial to Parallel Conversion Section 208, passed through multiplexer 410, and then output via the parallel output lines thereof.

A remote loop-back mode configuration of port IC 124 can also be implemented and used for testing adapter and switch applications, discussed further hereinafter, where data input from Photodetector Input Receiver 202 is selected by Multiplexer 410, and after clock and data recovery in Clock Data Recovery Circuit 602, that data is selected by Multiplexer 412, which outputs the data to Laser Output Controller 204.

Figure 5:
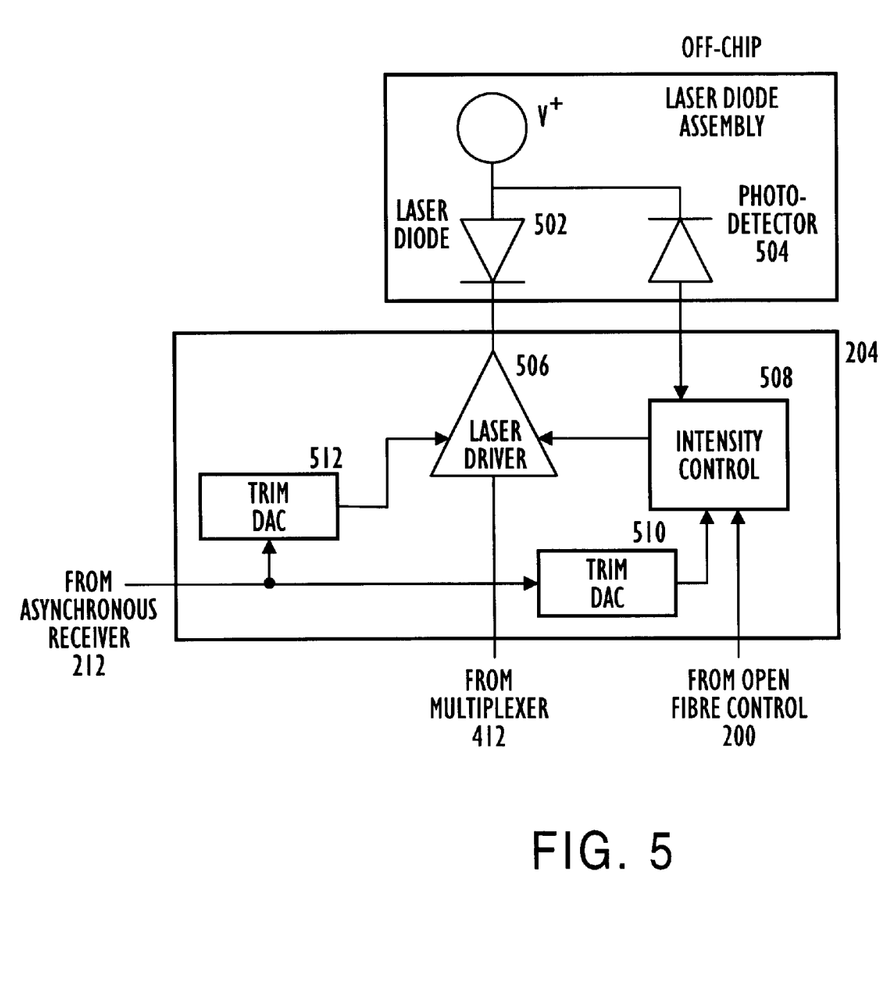
FIG. 5 is a more detailed block diagram of the Laser Output Controller depicted in FIG. 3.

As seen in FIG. 5, Laser Output Controller 204 has, for example, a Laser Driver 506, Intensity Control 508, and two trim digital to analog converters (DACs) 510 and 512. Laser diode 502 and a photo-detector 504 are coupled to Laser Output Controller 204 via load resistors and coupling capacitors that are not shown. Laser diode 502 transforms the electronic analog signal to an optical signal and transfers the optical signal to a fiber optic medium. Photo-detector 504, which in the presently preferred embodiment is a monitor diode, is used in conjunction with Intensity Control 508 to regulate the optic power of laser diode 502. Laser diode 502 is controlled by Laser Driver 506, which transforms the digital signal input to it to an analog signal. Trim DACs 510 and 512 are used to set laser diode average, or bias, level and the peak transmit level, or extinction ratio. More particularly, DAC 510 sets the average power level, and DAC 512 sets the extinction ratio.

Figure 6:
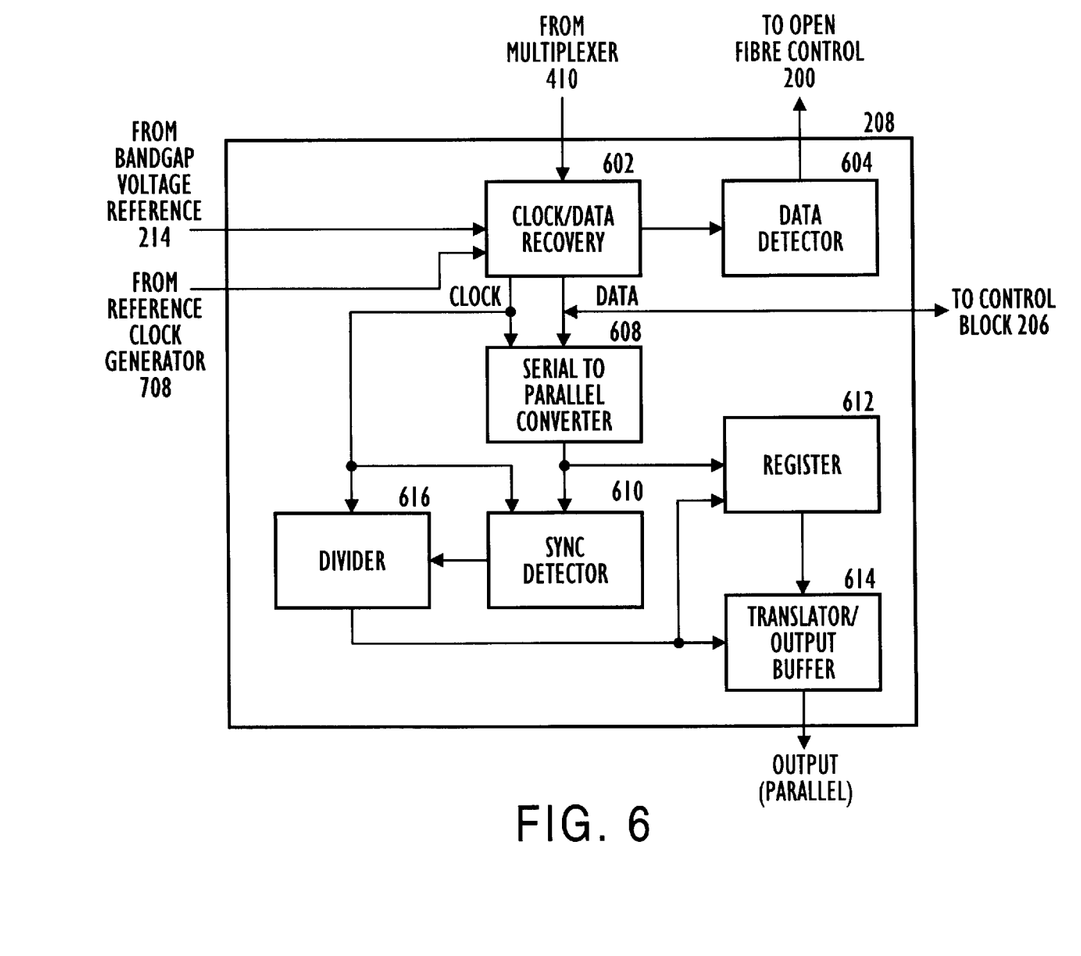
FIG. 6 is a more detailed block diagram of the Clock & Data Recovery Section depicted in FIG. 3.

As seen in FIG. 6, Clock/Data Recovery and Serial to Parallel Conversion Section 208 has, for example, Clock/Data Recovery 602, AC Data Detector 604, serial to parallel converter 608, sync detector 610, register 612, Translator/Output Buffer 614, and divider 616. Clock/Data Recovery 602 receives the selected output from multiplexer 410. Clock/Data Recovery 602 recovers the data and the clock signal contained in the input received from multiplexer 410. Various ways of constructing Clock/Data Recovery 602 are disclosed in co-pending U.S. patent application Ser. No. 08/957,694, entitled CLOCK RECOVERY CIRCUIT, which was filed Oct. 24, 1997 and which has been assigned attorney docket number 11794-573-0002. The contents of that application are expressly incorporated herein by reference.

AC Data Detector 604 detects whether Clock/Data Recovery 602 has received data in the form of a modulated signal and supplies a signal to Open Fibre Control 200 that is indicative thereof, pursuant to paragraph 6.2.3 of the Fibre Channel Standard. The recovered data is supplied to Control Block 206 as well as serial to parallel converter 608. The parallel data is read into, and out of, register 612 and Translator/Output Buffer 614 in accordance with the output of divider 616, which divides the recovered clock signal based on a sync signal contained in the data and which is detected by sync detector 610. The parallel output of Translator/Output Buffer 614 can be supplied to a device, such as a computer, that monitors the data for errors, corrects the detected errors, and reintroduces the corrected data through the parallel input to Data Transmission and Parallel to Serial Conversion Section 210.

The sync signal is one of two characters used to signal the start and end of a frame in Fibre Channel signaling. One example of a sync signal could be the bit pattern "0011111XXX." This bit pattern is known as "comma plus." In this example, the recovered data contains blocks of ten bits each. In a system utilizing the Gigabit Ethernet standard, the recovered clock signal has a frequency of 1.25 GHz. A complete block of ten bits will, however, appear with a frequency of only 125 MHz. Thus, in this example, divider 616 divides the recovered clock signal by ten.

Figure 7:
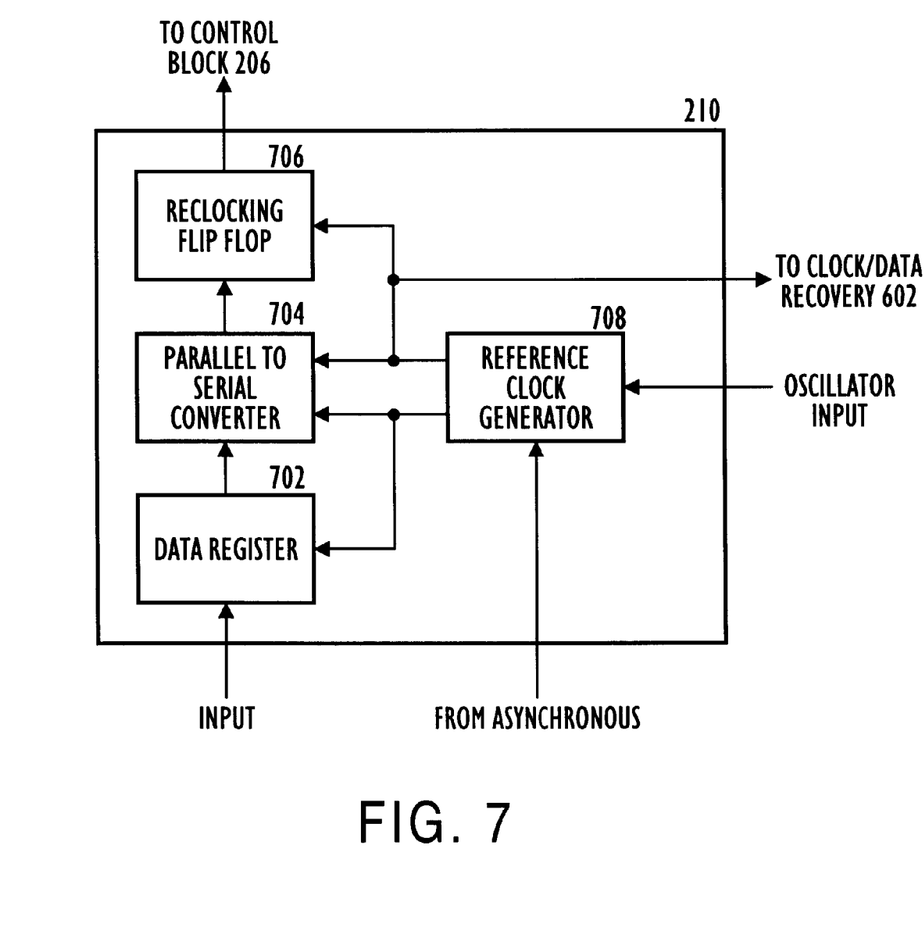
FIG. 7 is a more detailed block diagram of the Data Transmission Section depicted in FIG. 3.

As seen in FIG. 7, Data Transmission and Parallel to Serial Conversion Section 210 has a data register 702, a parallel to serial converter 704, reclocking flip flop 706, and a reference clock generator 708. Data register 702 receives parallel data from a source such as the computer discussed above. Using the "ten bit per block" example discussed above, the parallel data is stored and converted into serial data (via parallel to serial converter 704) at a rate that is one-tenth the rate at which the serial data is to be transmitted. Accordingly, reference clock generator 708 produces one of two different clock frequencies. A divider, such as divider 616, can be used to take one frequency and produce the other. Reclocking flip flop 706 is used for ensuring the serial data is sent to Control Block 206 at the transmit frequency.

In a system that is to be able to selectively implement the ANSI standard or the Gigabit Ethernet standard, reference clock generator 708 selectively produces a frequency of 1.0625 GHz or 1.25 GHz. This is accomplished by using a pair of crystal oscillator cells. Crystals can produce frequencies of, for example, 21.25 MHz and 25.00 MHz. Asynchronous Receiver 212 causes the appropriate crystal to be selected. A loop filter and a voltage controlled oscillator increase the frequency produced by the selected crystal oscillator by a factor of 50.

Although many of the main components of the ports have been described above, the ports may also contain known techniques for implementing such functions as power-on-reset and an analog signal test multiplexer. In addition, although use of fiber optic cable has been described above, other cables such as coaxial or twisted pair can be used instead. Use of different types of transmission cables can be easily accomplished because photo-detector/pre-amplifier 302, laser diode 502, and photo-detector 504 are not integrated into the open fibre port IC, but are instead contained in the optical front end. Thus, unlike in the circuit cards described previously, a single integrated circuit (i.e., each port IC 124, 126, 128, . . . 142) contains all of the components necessary for routing data to the appropriate destination, converting serial data into parallel data, and for converting parallel data into serial data. This single IC design has distinct advantages over the use of a circuit card. For example, circuit cards are large, expensive, and difficult to mass produce with each card having nearly identical characteristics, which becomes more important at the higher frequencies used in the fibre channel and gigabit ethernet standards. The use of an IC overcomes these disadvantages and improves signal quality through reduction of signal path lengths and incorporation of functions onto a single chip.

Figure 8A:
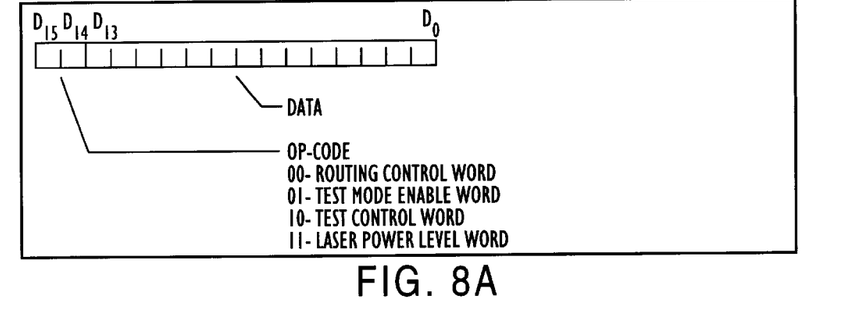
FIGS. 8A–E are control word diagrams for controlling the port depicted in FIG. 3.
Figure 8B:
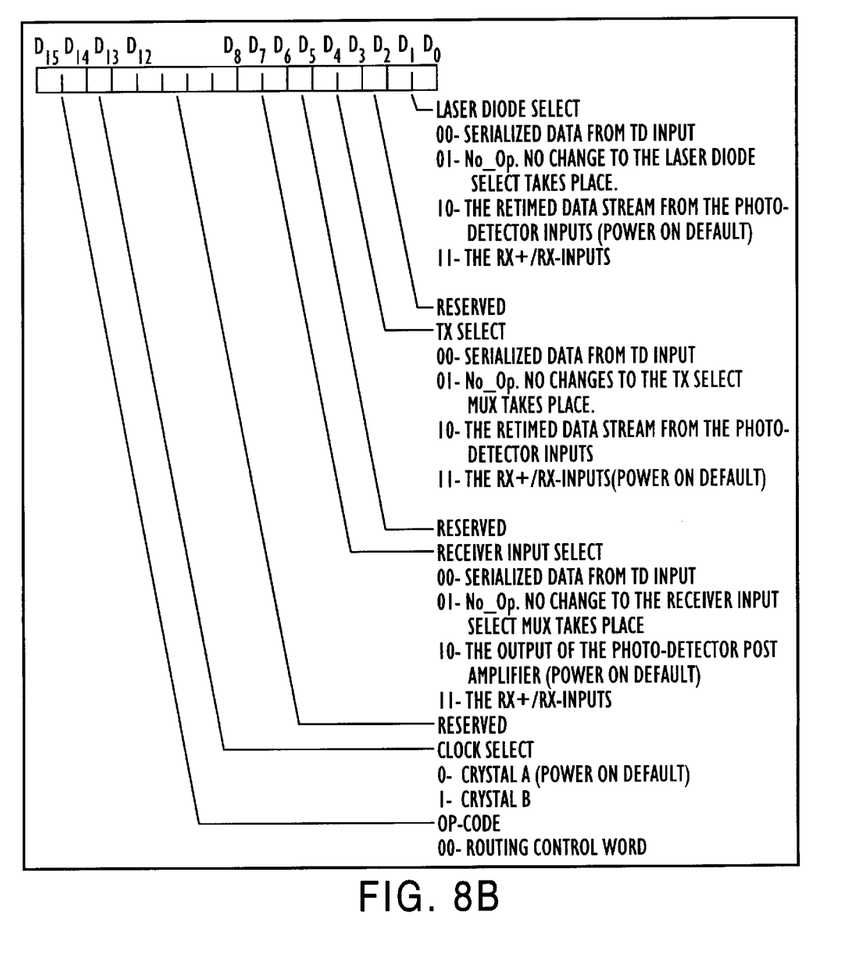

As seen in FIGS. 8A–E, the control words used can be 16 bits in length. These figures demonstrate how control words can be used to configure and test each of the ports. FIG. 8A shows that bits $D_{15}$ and $D_{14}$ are used for operation codes and the remaining bits are used for data (i.e., the control word). In this example, Operation code "00" indicates that the control word is to be routed to the ports. As seen in FIG. 8B, when this operation code is used, bit $D_{13}$ indicates which of the two crystal oscillators reference clock generator 708 is to use. Bits $D_7$ and $D_6$ indicate which input multiplexer 410 is to select. Bits $D_4$ and $D_3$ indicate which input multiplexer 414 is to select. Bits $D_1$ and $D_0$ indicate which input multiplexer 412 is to select.

Figure 8C:
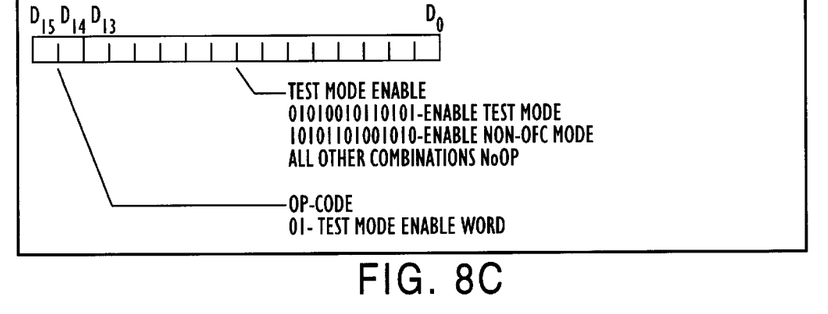

Operation code "01" indicates that the control word is to be used for entering a test mode. As seen in FIG. 8C, if bits D13–D0 are set to "01010010110101" a test mode is enabled. A second control word, such as "0101101001010", can be used for enabling a non-OFC mode. To ensure that the test mode is not accidentally enabled, an external pin must be used in conjunction with the code words described above.

Figure 8D:
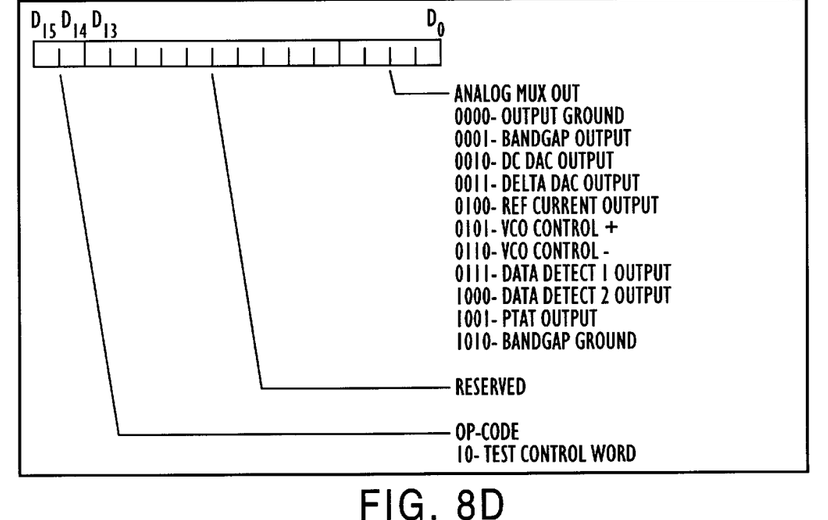

Operation code "10" indicates that the control word is to be used to control an analog output test multiplexer. As seen in FIG. 8D, 4 bits are used to indicate which of several inputs is to be selected by the analog test multiplexer. As seen in this figure, the inputs to the analog test multiplexer can include such things as the output of bandgap voltage reference 214 and the output of the Data Detectors 404 and 604.

Figure 8E:
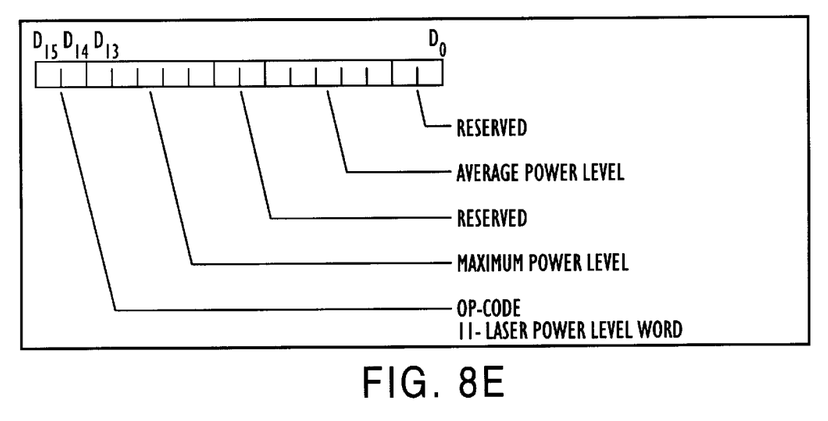

Operation code "11" indicates that the control word is to be used for setting the laser power level. As seen in FIG. 8E, 5 bits are used to indicate the maximum power level and 5 bits are used to set the average laser diode power level. The power level can preferably only be set once at power on, unless in a test mode.

A network hub designed in the foregoing manner can operate in the following way if a device connected via a fiber optic cable to port P1 had to communicate with another device connected via a fiber optic cable to port P10 (i.e only ports P1 and P10 were connected. The controllers would have the Asynchronous Receiver 212 within each port IC 124–142 receive the appropriate control word to configure the multiplexers within a port IC, in accordance with which port IC was connected to a device (in this example ports P1 and P10 and therefore port IC's 124 and 142), and which port IC's were simply passing data through (in this example ports P2–P9 and therefore port IC's 126–140). Accordingly, the following control words would be used for each of the different ports.

Port IC 124 associated with Port P1 would utilize the following type of control word to configure the Multiplexers: "00XXXXXX10X10X11". This control word causes Multiplexer 412 to select the data received from port P10 via PECL Receiver 402 and path switch 144. Port P1 outputs data to port P2 via PECL Output 408 in this configuration. The control words utilized in to control the port IC 126 of port P2 as well as the port IC's 128–140 of ports P3–P9 are all be the same since each are only passing data through in this example. Accordingly, multiplexer 414 would have to be set to select the data from PECL Receiver 402. This would be accomplished with a control word to configure the Multiplexers that looks as follows: "00XXXXXXXXX11XXX".

Port IC 142 associated with Port P10 would utilize the following type of control word to configure the Multiplexers: "00XXXXXX10X10X11". This control word, in a manner like that of the control word for port P1, causes multiplexer 412 to select the data received from port P9 via PECL Receiver 402.

In sum, through the use of control words, the present invention is able to specifically configure each port IC, such as a port IC 124 in a manner specific to the mode desired. For example, a port IC can be configured in the loop back configuration (using control word "00XXXXXX00XXXXXX" to configure the Multiplexers) and remote loop back configuration (using control word "00XXXXXX10XXXX10" to configure the Multiplexers) previously described. A port IC can also be configured to send reclocked data or encoded data to another port IC using a number of different configurations, and, accordingly, control words.

In yet another example of the many configurations possible with the present invention, parallel data received on the parallel input lines of Data Transmission and Parallel to Serial Conversion Section 210 can be output via the serial output line of Control Block 206. For this example, a control word of "00XXXXXXXXX00XXX" would be used to configure the Multiplexers.

The Laser Diode Select, the TX Select, and the Receiver Input Select bits within the control word each include the bit pattern "01" as a No-option. This enables each of the multiplexers 410, 412, and 414 receiving the No-option signal to remain in the state that it is in while the other multiplexers may be changed. This is needed because the current value cannot be read from the device, so a controller need not store the current state.

FIG. 9 illustrates a 10-port fibre channel or gigabit ethernet network switch or repeater 902 according to the present invention. Network switch or repeater 902 is similar to the architecture shown in FIG. 1 in that it uses the same port components, though they are connected differently, as shown in FIG. 9. In this application, however, two controllers 952 and 954 are utilized to implement a 5 or 10 port dedicated switch or repeater application.

Controller 952 is connected to each of five port ICs 924, 926, 928, 930, 932, via the parallel TD/RD ports or serial TX/RX ports. Controller 954 is connected to each of the remaining five port ICs 934, 936, 938, 940, 942, via the parallel TD/RD ports or serial TX/RX ports. All of the optical front end and port IC's in this embodiment and identical to the optical front end 104 and port IC 124 described in detail previously. Controllers 952 and 954 contain logic and control circuits so that they can route data to and from various port ICs. For example, controller 952 can be programmed so that port P1 can be coupled (through controller 952) to port P4, while port P2 is coupled to port P5. In short, controllers 952 and 954 can be used to create a switch or star configuration, in contrast to the loop formed by the embodiment of the hub 102 previously described.

In addition, controllers 952 and 954 can be used to repeat the output of one of the ports to all of the other ports or even selected ones of the other ports. Thus, if it is determined that a particular port is not currently in service, the controllers 952 and 954 can ensure that data is not sent to that port.

Because amplification and reclocking are performed by the port ICs, controllers 952 and 954 need not include these functions. Controllers 952 and 954 may include memory for storing data before the data is output to the destination port or ports. Controllers 952 and 954 may also include circuitry for restoring and reframing the data before routing the data to the destination port or ports.

There are numerous additional applications for the network switch or repeater shown in FIG. 9. For example, the set of five ports coupled to controller 954 can be used as a redundant backup for the set of five ports coupled to controller 952. Further, controllers 952 and 954 can be designed with management and monitoring functions for monitoring traffic and managing the network switch or repeater.

Figure 10:
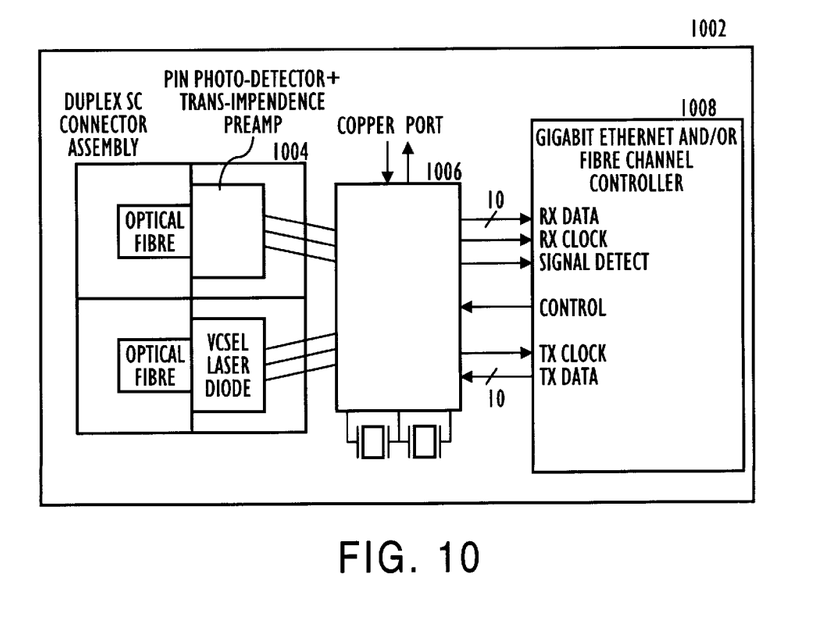
FIG. 10 illustrates an adapter card according to the present invention.

FIG. 10 illustrates another aspect of the present invention. In this application, an adapter card 1002 includes an Optical Front End 1004, a port IC 1006, and a controller 1008. The optical front end and port IC components in this embodiment are identical to the optical front end 104 and port IC 124 described in detail previously.

As shown, the port IC 1006 receives parallel data on the parallel input lines of Data Transmission and Parallel to Serial Conversion Section 210 can be output via Laser Output Controller 204, and the data received by the Photodetector Input Receiver 202 can be reclocked or decoded and recoded and then output in parallel via Clock/Data Recovery and Serial to Parallel Conversion Circuit 208. For this example, a control word of "00XXXXXX10XXXX00" would be used to configure the Multiplexers.

This configuration allows adapter cards to be placed within remotely located hardware, and allow such cards to be used with or without a hub of the type shown in FIGS. 1 and 9. When used with a hub, the configuration illustrated above is preferably used. When used without a hub, the serial output of the Port IC 1006 can be cascaded to the serial input port of another adapter card so as to create a ring configuration, in which case the Port IC 1006 associated with a connected adapter card would utilize the following type of control word to configure the Multiplexers: "00XXXXXX10XXXX00".

In addition, the serial output and input ports of various adapter cards can be connected to a repeater like the one shown in FIG. 9.

The controller 1008 is connected to the serial input and output ports of the port IC 1006. Controller 1008 can be a Fibre Channel or Gigabit Ethernet controller, depending on the application required.

While the preferred embodiment and details of the invention have been described above, it will be apparent to those skilled in the art that various changes and modification may be made without departing from the scope of the invention, as is defined by the claims below.

I claim:

1. A signal routing integrated circuit comprising:

a first receiver circuit constructed to amplify a data signal;

a second receiver circuit constructed to receive first serial data;

a first multiplexer constructed to route one of the amplified data signal, the first serial data, and second serial data in dependence on a state of a control word;

a second multiplexer constructed to route one of the first serial data, the second serial data, and reclocked data in dependence on the state of the control word;

a third multiplexer constructed to route one of the first serial data, the second serial data, and reclocked data in dependence on the state of the control word;

a reclocking circuit constructed to recover a clock signal from the data routed by the first multiplexer and to reclock, in accordance with the recovered clock signal and a reference clock signal, the data routed by the first multiplexer so as to generate the reclocked data;

a serial to parallel converter constructed to convert the reclocked data to parallel reclocked data;

a parallel to serial converter constructed to convert received parallel data to second serial data;

a serial transmitter circuit constructed to transmit the data routed by the third multiplexer;

an output controller constructed to transmit the data routed by the second multiplexer; and a parallel transmitter circuit constructed to transmit the parallel reclocked data.

2. A signal routing integrated circuit according to claim 1 further including a flip-flop constructed to reclock, in accordance with the reference clock signal, the second serial data.

3. A signal routing integrated circuit according to claim 1, wherein the amplified data signal, the first serial data, the second serial data, and the reclocked data each have a frequency above 1 GHz.

4. A signal routing integrated circuit according to claim 1, wherein the amplified data signal, the first serial data the second serial data, and the reclocked data have a same nominal frequency.

5. A signal routing integrated circuit according to claim 4, wherein the amplified data signal, the first serial data, the second serial data, and the reclocked data have the same nominal frequency of about 1.25 GHz.

6. A signal routing integrated circuit according to claim 4, wherein the amplified data signal, the first serial data, the second serial data, and the reclocked data have the same nominal frequency of about 1.0625 GHz.

7. A signal routing integrated circuit according to claim 1, further including a reference clock generator that is constructed to generate the reference clock signal with one of a plurality of clock frequencies, and to select, in accordance with the control word, one of the plurality of clock frequencies.

8. A signal routing integrated circuit according to claim 7, wherein the plurality of clock frequencies include 1.25 GHz and 1.0625 GHz.

9. A signal routing integrated circuit according to claim 1 further comprising a bandgap voltage reference generator constructed to generate a reference voltage for powering the reclocking circuit.

10. A signal routing integrated circuit comprising:

a first receiver circuit constructed to amplify a data signal;

a second receiver circuit constructed to receive first serial data;

a first multiplexer constructed to route one of the amplified data signal, the first serial data, and second serial data in dependence on a state of a control word;

a second multiplexer constructed to route one of the first serial data, the second serial data, and reclocked data in dependence on the state of the control word;

a third multiplexer constructed to route one of the first serial data, the second serial data, and reclocked data in dependence on the state of the control word;

a reclocking circuit constructed to recover a clock signal from the data routed by the first multiplexer and to reclock, in accordance with the recovered clock signal and a reference clock signal, the data routed by the first multiplexer so as to generate reclocked data;

a serial to parallel converter constructed to convert the reclocked data into parallel reclocked data;

a sync detector constructed to detect a sync word within the parallel reclocked data generated by the serial to parallel converter and to generate a sync signal when a sync word has been detected;

a parallel to serial converter constructed to convert received parallel data to the second serial data;

a parallel transmitter circuit constructed to transmit the parallel reclocked data in accordance with the sync signal;

a serial transmitter circuit constructed to transmit the data routed by the third multiplexer; and an output controller constructed to amplify, in accordance with the control signal, and transmit, the data routed by the second multiplexer.

11. A signal routing integrated circuit according to claim 10 further comprising:

a first data detector constructed to detect whether the first receiver circuit has generated the amplified data signal and to generate a first data detect signal indicating such detection;

a second data detector constructed to detect whether the reclocking circuit has generated the reclocked data and to generate a second data detect signal indicating such detection; and an open fibre control circuit constructed to generate a control signal in accordance with the first and second data detect signals.

12. A signal routing integrated circuit according to claim 10, further including a flip-flop constructed to reclock, in accordance with the reference clock signal, the second serial data.

13. A signal routing integrated circuit according to claim 10, wherein the amplified data signal, the first serial data, the second serial data, and the reclocked data each have a frequency above 1 GHz.

14. A signal routing integrated circuit according to claim 10, wherein the amplified data signal, the first serial data, the second serial data, and the reclocked data have a same nominal frequency.

15. A signal routing integrated circuit according to claim 14, wherein the amplified data signal, the first serial data, the second serial data, and the reclocked data have the same nominal frequency of about 1.25 GHz.

16. A signal routing integrated circuit according to claim 14, wherein the amplified data signal, the first serial data, the second serial data, and the reclocked data have the same nominal frequency of about 1.0625 GHz.

17. A signal routing integrated circuit according to claim 10 further including a reference clock generator that is constructed to generate the reference clock signal with one of a plurality of clock frequencies, and to select, in accordance with the control word, one of the plurality of clock frequencies.

18. A signal routing integrated circuit according to claim 17, wherein the plurality of clock frequencies include 1.25 GHz and 1.0625 GHz.

19. A signal routing integrated circuit according to claim 10 further comprising a bandgap voltage reference generator constructed to generate a reference voltage for powering the reclocking circuit.

20. A signal routing apparatus comprising:
a photo detector that detects a data signal;
a laser diode; and
a signal routing integrated circuit, the signal routing integrated circuit including:
a first receiver circuit constructed to amplify the data signal,
a second receiver circuit constructed to receive first serial data,
a first multiplexer constructed to route one of the amplified data signal, the first serial data, and second serial data in dependence on a state of a control word,
a second multiplexer constructed to route one of the first serial data, the second serial data, and reclocked data in dependence on the state of the control word,
a third multiplexer constructed to route one of the first serial data, the second serial data, and reclocked data in dependence on the state of the control word,
a reclocking circuit constructed to recover a clock signal from the data routed by the first multiplexer and to reclock, in accordance with the recovered clock signal and a reference clock signal, the data routed by the first multiplexer so as to generate the reclocked data,
a serial to parallel converter constructed to convert the reclocked data to parallel reclocked data,
a parallel to serial converter constructed to convert received parallel data to second serial data,
a serial transmitter circuit constructed to transmit the data routed by the third multiplexer,
an output controller constructed to transmit the data routed by the second multiplexer to the laser diode and to control the laser diode, and
a parallel transmitter circuit constructed to transmit the parallel reclocked data.

21. A signal routing apparatus according to claim 20, wherein the signal routing integrated circuit further comprises:
a sync detector constructed to detect a sync word within the parallel reclocked data generated by the serial to parallel converter and to generate a sync signal when a sync word has been detected.

22. A signal routing apparatus according to claim 20, wherein the signal routing integrated circuit further comprises:
a first data detector constructed to detect whether the first receiver circuit has generated the amplified data signal and to generate a first data detect signal indicating such detection;
a second data detector constructed to detect whether the reclocking circuit has generated the reclocked data and to generate a second data detect signal indicating such detection; and
an open fibre control circuit constructed to generate, in accordance with the first and second data detect signals, a control signal.

23. A signal routing apparatus according to claim 20, wherein the signal routing integrated circuit further comprises a flip-flop constructed to reclock, in accordance with the reference clock signal, the second serial data.

24. A signal routing apparatus according to claim 20, wherein the amplified data signal, the first serial data, the second serial data, and the reclocked data each have a frequency above 1 GHz.

25. A signal routing apparatus according to claim 20, wherein the amplified data signal, the first serial data, the second serial data, and the reclocked data have a same nominal frequency.

26. A signal routing apparatus according to claim 25, wherein the amplified data signal, the first serial data, the second serial data, and the reclocked data have the same nominal frequency of about 1.25 GHz.

27. A signal routing apparatus according to claim 25, wherein the amplified data signal, the first serial data, the second serial data, and the reclocked data have the same nominal frequency of about 1.0625 GHz.

28. A signal routing apparatus according to claim 20, wherein the signal routing integrated circuit further comprises a reference clock generator that is constructed to generate the reference clock signal with one of a plurality of clock frequencies, and to select, in accordance with the control word, one of the plurality of clock frequencies.

29. A signal routing apparatus according to claim 28, wherein the plurality of frequencies include 1.25 GHz and 1.0625 GHz.

30. A signal routing apparatus according to claim 20, wherein the signal routing integrated circuit further comprises a bandgap voltage reference generator constructed to generate a reference voltage for powering the reclocking circuit.

31. A signal routing integrated circuit chip capable of routing input signals to a plurality of different outputs comprising:
a substrate;
means disposed on the substrate for receiving first serial input data;
means disposed on the substrate for receiving second serial input data;
means disposed on the substrate for receiving first parallel input data;
means disposed on the substrate for converting the first parallel input data to first converted serial data;
means disposed on the substrate for reclocking any one of the first serial input data, the second serial input data, and the first converted serial data, the one being selected in dependence upon an off-chip control signal, to generate reclocked data therefrom;
means disposed on the substrate for converting the reclocked data to first parallel reclocked data;
means disposed on the substrate for routing one of the reclocked data, the second serial input data, and the first converted serial data as first serial output data in dependence upon the off-chip control signal;
means disposed on the substrate for routing one of the reclocked data, the second serial input data, and the first converted serial data as second serial output data in dependence upon an off-chip control signal; and
means disposed on the substrate for converting the reclocked data into parallel output data and for routing the parallel output data.

32. A signal routing integrated circuit chip according to claim 31 further comprising:
means disposed on the substrate for detecting a sync word within the parallel output data and for generating a sync signal when a sync word has been detected.

33. A signal routing integrated circuit chip according to claim 31 further comprising:
   means disposed on the substrate for detecting whether the first serial input data has been received by the signal routing integrated circuit chip and for generating a first data detect signal indicating such detection;
   means disposed on the substrate for detecting whether the reclocked data has been generated and for generating a second data detect signal indicating such detection; and
   means for generating a control signal in accordance with the first and second data detect signals.

34. A signal routing integrated circuit chip according to claim 31, wherein the first serial input data, the second serial input data, the first converted serial data, and the reclocked data each have a frequency above 1 GHz.

35. A signal routing integrated circuit chip according to claim 31, wherein the first serial input data, the second serial input data, the first converted serial data, and the reclocked data each have a same nominal frequency.

36. A signal routing integrated circuit chip according to claim 31, wherein the first serial input data, the second serial input data, the first converted serial data, and the reclocked data have the same nominal frequency of about 1.25 GHz.

37. A signal routing integrated circuit chip according to claim 31, wherein the first serial input data, the second serial input data, the first converted serial data, and the reclocked data have the same nominal frequency of about 1.0625 GHz.

38. A signal routing integrated circuit chip according to claim 31 further comprising means disposed on the substrate for selecting one of a plurality of clock frequencies in accordance with the off-chip control signal and for generating a reference clock signal having the selected one of the plurality of clock frequencies.

39. A signal routing integrated circuit chip according to claim 38, wherein the plurality of clock frequencies include 1.25 GHz and 1.0625 GHz.

40. A signal routing integrated circuit chip according to claim 31 further comprising means disposed on the substrate for generating a reference voltage.

* * * * *